United States Patent [19]
Carr et al.

[11] Patent Number: 5,478,168
[45] Date of Patent: Dec. 26, 1995

[54] POLLUTANT CONTAINMENT BOOM

[76] Inventors: Rupert E. Carr; Dominic Michaelis, both of Rycote Park, Milton Common, Oxford OX9 2PE, United Kingdom

[21] Appl. No.: 186,388

[22] Filed: Jan. 24, 1994

[30] Foreign Application Priority Data

Jul. 24, 1991 [GB] United Kingdom ............... 9115948

[51] Int. Cl.⁶ ........................................... E02R 15/04
[52] U.S. Cl. .................... 405/68; 405/63; 405/72
[58] Field of Search ............................ 405/63, 66, 68, 405/69, 72; 210/923

[56] References Cited

U.S. PATENT DOCUMENTS

| | | | |
|---|---|---|---|
| 3,613,377 | 10/1971 | Zaugg | 405/68 |
| 4,300,856 | 11/1981 | Magoon et al. | 405/66 |
| 4,879,026 | 11/1989 | Metais | 405/68 X |

FOREIGN PATENT DOCUMENTS

| | | |
|---|---|---|
| 90144589 | 10/1990 | Germany . |
| 1278938 | 6/1972 | United Kingdom . |
| 1594868 | 8/1981 | United Kingdom . |
| 2117326 | 10/1983 | United Kingdom . |
| WO8300517 | 2/1983 | WIPO . |
| WO8604942 | 8/1986 | WIPO . |

Primary Examiner—David H. Corbin
Attorney, Agent, or Firm—Litman, McMahon and Brown

[57] ABSTRACT

An arrangement for containing oil spillage comprises an inflatable boom and suspended in the water therefrom an anti-pollution skirt and/or a deformable tube, cables and a generally horizontal membrane to restrict movement of the boom. The boom may be deployed in an uninflated condition and then inflated from an adjacent buoy. The deformable tube is arranged to pump fluid in response to forces on the cables caused by motion of the water.

8 Claims, 7 Drawing Sheets

POLLUTANT CONTAINMENT BOOM

The present invention relates to a pollutant containment boom and more particularly to a boom which can be deployed to contain an oil spillage at sea.

A problem with existing booms is that they tend to be moved by the sea under the influence of waves, wind and tide. Thus it is difficult to keep the boom in place where it is deployed and the whole boom can drift away and/or its shape can be distorted from its required disposition. Also, the boom can be lifted out of the water by these forces, and this can lead to pollutant leakage.

The present invention seeks to overcome or reduce one or more of the above problems.

GB-A-2117326 discloses a boom with a skirt depending therefrom and having ballast at the bottom of the skirt; the sides of the skirt incorporate upwardly-directed pockets which admit sea-water to oppose upward displacements of the boom.

According to a first aspect of the present invention, there is provided a containment arrangement comprising an inflatable boom member arranged to float on the water, at least one further member depending from the boom member, a plurality of cable members depending from the further member, and depending from the cable members, a membrane member which produces substantial water resistance to movement of the boom member, at least a major part of the surface of the membrane member being arranged to be horizontal or at an angle to the horizontal of up to 45°.

The further member may be an anti-pollution flap or skirt, or a submerged or partly-submerged deformable tube serving to pump fluid in response to motion of the water. In preferred arrangements both a flap and a tube are provided with the tube extending along the top or the bottom of the flap.

An advantage of this arrangement is that, dependent upon sea conditions, the membrane member may be conveniently arranged at any desired depth. If the further member were to extend all the way down to the membrane member with no intervening cables, there would be excessive lateral forces imposed by the sea or the containment arrangement.

The membrane member is arranged to restrict movement of the boom member under the influence of external forces. It is preferably planar and its plane is preferably arranged to lie within 10° of the horizontal.

The membrane member may comprise a membrane held between two generally parallel edge support members, e.g. pressurised tubes. Cross battens may also be provided to maintain the edge support members at a desired spacing.

In preferred arrangements the cable members themselves are relatively inextensible. However, means may be provided for adjusting the effective length of the cable members (i.e the distance between the further member and the membrane member) in dependence upon prevailing sea-conditions. The adjustment may be effected manually when deploying the boom or after deployment. Alternatively the top of each cable member may be connected to the further member by means of an automatic length adjuster such as a pre-loaded spring system which, as the wave height changes and the force on the top of the cable member changes, automatically extends or retracts the cables.

Another problem with existing booms is the time required to inflate the boom members. If they are supplied pre-inflated they occupy too much space. If they are inflated as they are deployed from a supply reel, the unreeling process needs to be continuously interrupted to allow full inflation to occur.

The present invention also seeks to overcome or reduce this problem.

According to a second aspect of the present invention there is provided a containment arrangement comprising an inflatable boom member arranged to float on the water, the boom member having at or adjacent to a part thereof a buoy also arranged to float on the water, the buoy incorporating means for inflating the boom member.

The invention also provides a method of deploying a containment arrangement as defined in the preceding paragraph, in which the buoy and boom members are deployed simultaneously and the boom member is inflated after deployment.

According to a third aspect of the present invention there is provided a containment arrangement comprising an inflatable boom member arranged to float on water, the boom member incorporating a horizontally-extending tubular member having a plurality of one-way valves, the tubular member being arranged to be deformable and to pump fluid in response to motion of the water.

Preferred embodiments of the present invention will now be described, by way of example only, with reference to the accompanying drawings, of which:

FIG. 8b and 8c are top sectional views at different times of a tube member of the arrangement of FIG. 8a;

FIGS. 9b and 9c are top sectional views at different times of a tube member of the arrangement of FIG. 9a.

Figure 1:
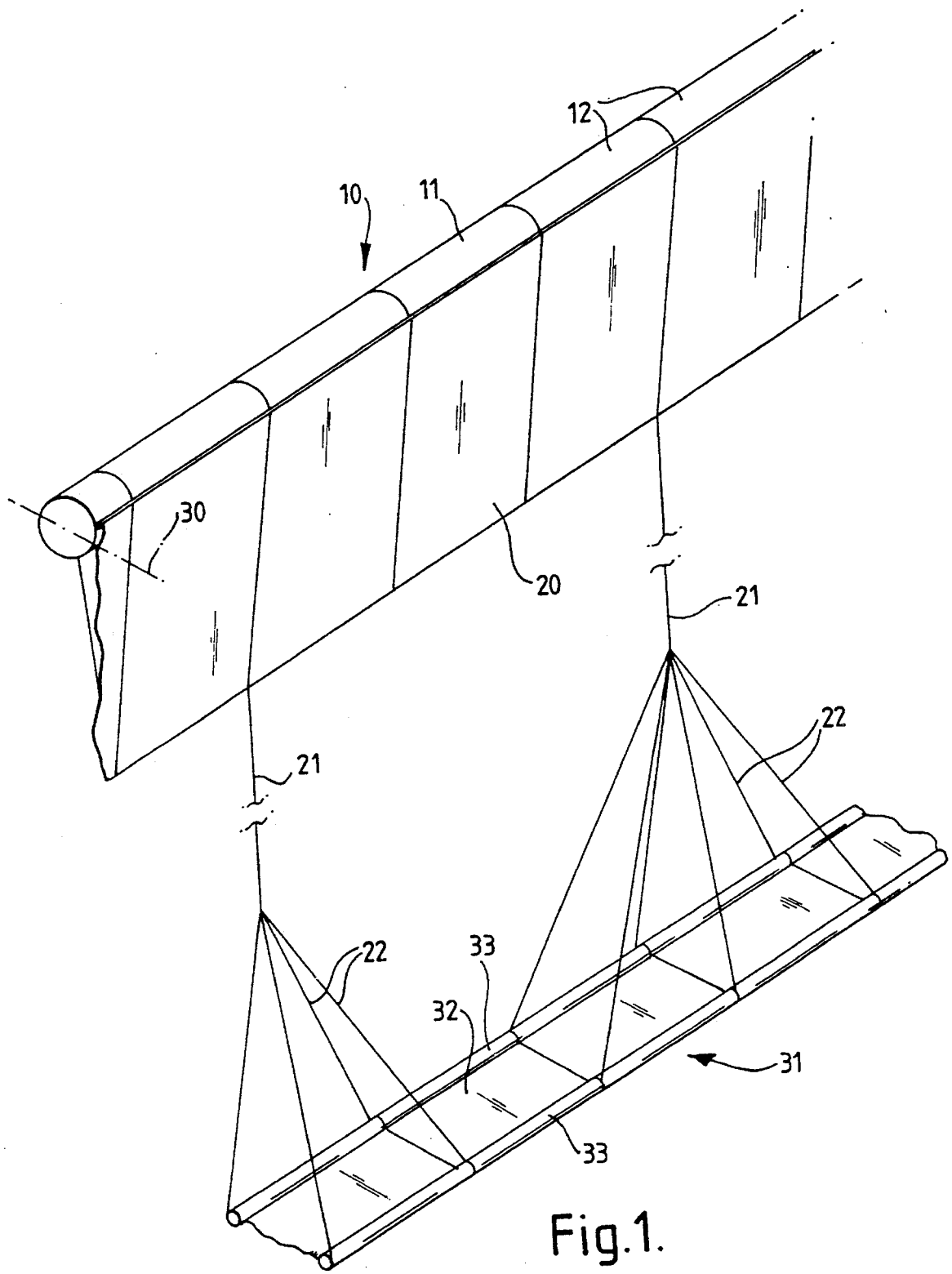
FIG. 1 is a perspective view of part of a spillage containment arrangement in accordance with a first embodiment of the present invention.

Referring to FIG. 1, a spillage containment arrangement 10 comprises a boom member 11 comprising a plurality of separately-inflatable boom chambers 12 arranged end-to-end. The inflated boom is arranged to float on the sea, the level of which is indicated at 30. The boom member is conveniently made of polyurethane-coated Kevlar or nylon material.

Attached to boom member 11, e.g. by welding, is a further member in the form of an anti-pollution flap or skirt 20 which is conveniently of the same material and may be weighted to adjust its buoyancy. It is deployed along with boom member 11 and is arranged to prevent the spread of a pollutant such as oil on or near the surface of the sea.

Suspended at spaced intervals from the flap 20 are relatively inextensible tension cables 21 which, via further cables 22, support a substantially horizontal membrane member 31 which serves as a flexible anchor member and a reaction pad. Member 31 comprises a membrane 32 which is again of the same material as the boom member 11, but may incorporate lead to increase its density. Alternatively it may be of neoprene or similar material. Member 31 is held between edge support members 33 in the form of pressurised tubes. The flap 20 incorporates curved reinforcement bands 27 which serve to strengthen the flap and distribute the load of the membrane member 31 along the boom 11.

Figure 2:
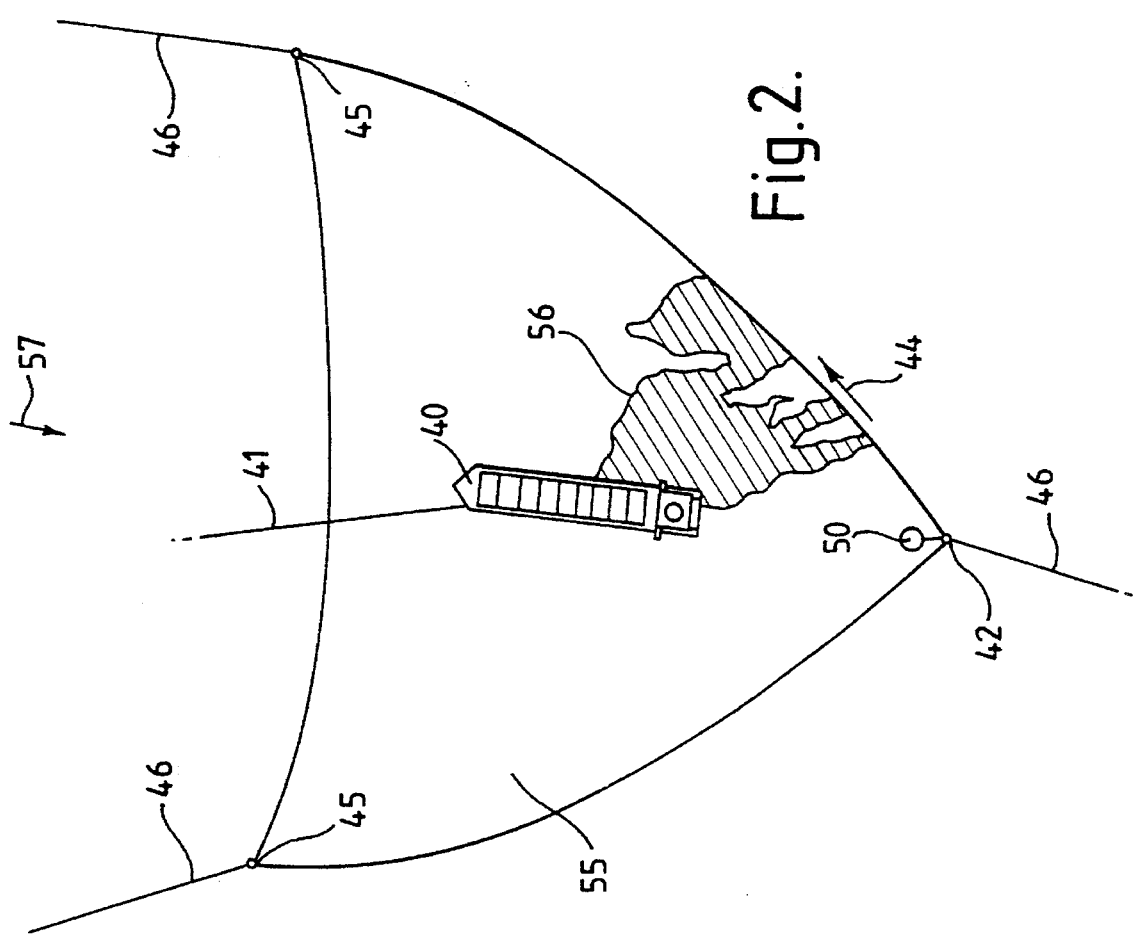
FIG. 2 is a plan view on a reduced scale of the deployed arrangement of FIG. 1.
Figure 5:
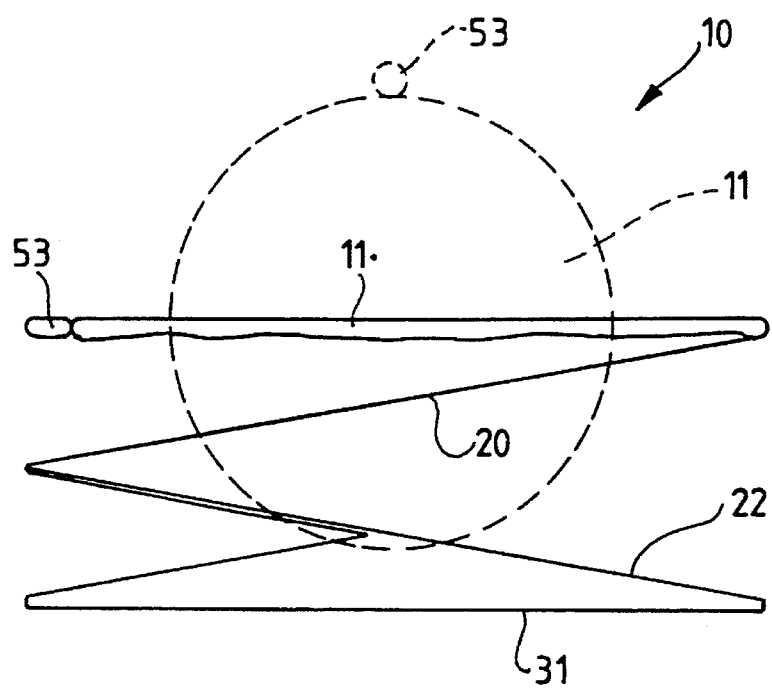
FIG. 5 is a view showing the boom in its packed disposition before deployment.

For storage, the boom member 11, flap 20, cables 21, 22, and membrane member 31 are folded flat as shown in FIG. 5. The arrangement can be packed flat in concertina form or it may be wound on a reel which is located on a small separate craft which may be carried by a larger craft, e.g. an oil tanker 40, as disclosed in U.K. patent application 2232383. Upon spillage of oil, the tanker 40 is anchored by means of line 41, and the separate craft (not shown) carrying the boom is launched. At point 42, FIG. 2, the smaller craft begins to unreel the boom and travels around the tanker 40 as indicated by arrow 44, deploying the boom as it moves. At spaced locations, as shown in FIG. 2, the boom has flexible hinges 45 which are anchored to the sea bed by means of lines 46. The wind direction is indicated by arrow 57.

Figure 3:
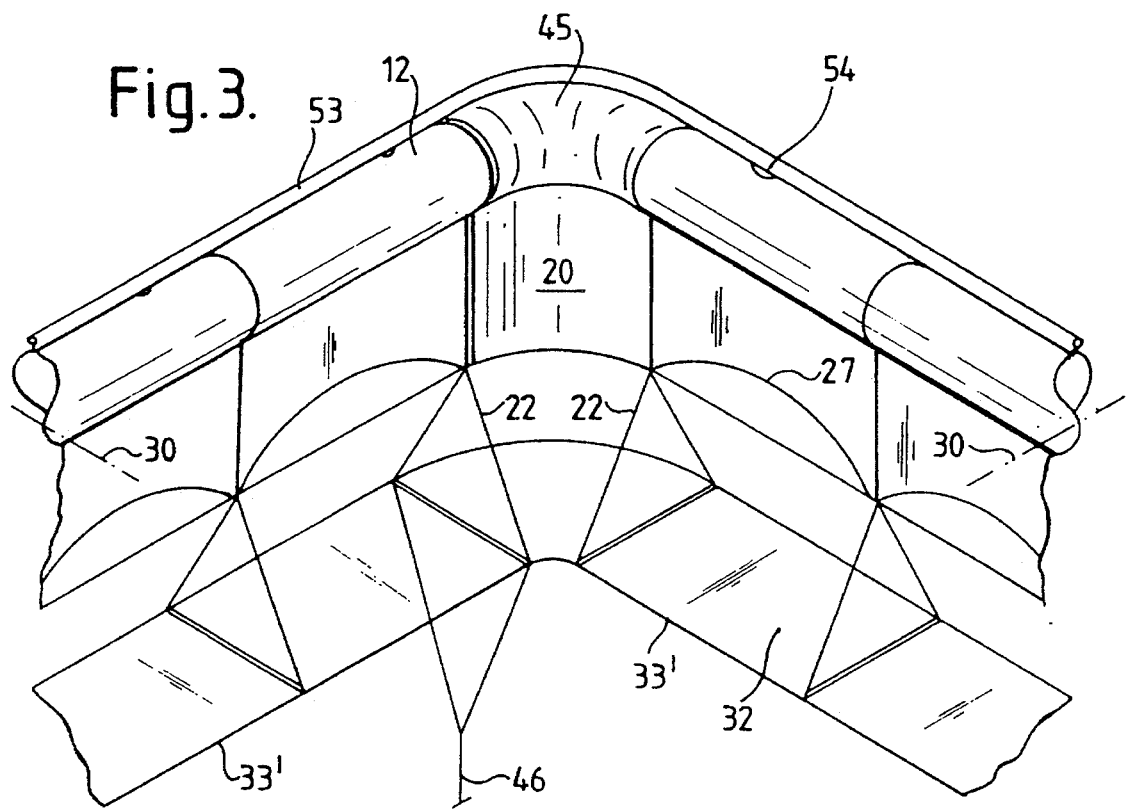
FIGS. 3 and 4 are perspective views of parts of a modification of the arrangement of FIG. 1.
Figure 4:
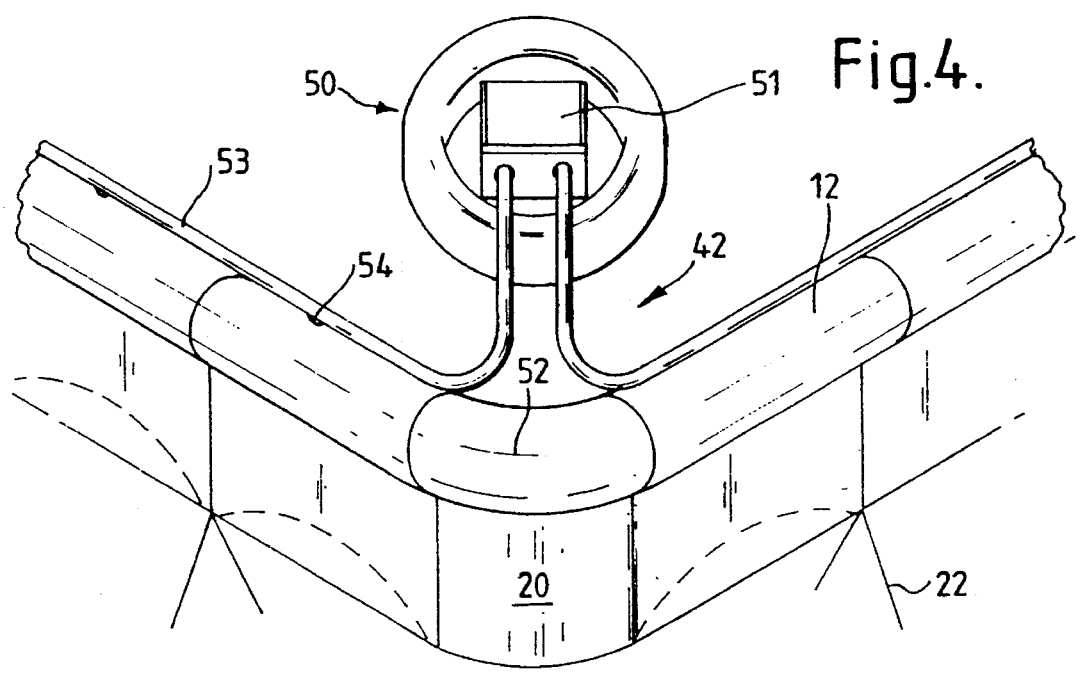

FIGS. 3 and 4 show enlarged views of a modification of the arrangement of FIG. 1 which differs in that cables 21 are omitted. At point 42, there is provided a boom junction element 52 so that the boom can take the form of a completely enclosed figure when the deployment craft returns to point 42. At this point the craft also launches a buoy 50 incorporating boom-inflating means 51 which is actuated during or after deployment of the boom. Air from the inflation means 51 passes through a common inflation line 53 and respective non-return valves 54 to the individual boom chambers 12. The fully-deployed boom encloses a containment area 55 and serves to contain any oil spillage 56 therein.

An advantage of the membrane member 31 is that all parts of the boom remain substantially where they are deployed relative to the starting point 42. The energy of the sea is harnessed by the membrane member to achieve this. The substantially horizontal disposition of the membrane member provides a considerable resistance to forces tending to lift the boom relative to the sea surface, while the presence of the cables 21, 22 minimises the lateral forces on the arrangement.

An advantage of the inflation buoy 50 is that it permits the boom to be deployed relatively rapidly since it separates the functions of boom deployment and inflation.

Various modifications may be made to the above-described arrangement. For example the edge support members 33 may be spaced apart by cross struts so that the membrane 32 is stretched. These struts and/or members 33 may be weighted to improve the action of the membrane member 31. The material of the membrane 32 may be as dense as required and may itself incorporate weights. Membrane member 31 also provides some sideways resistance to movement of the boom member 11, and thus can serve as a sea anchor. Accordingly the anchor lines 46 to the sea bed may be omitted if desired. Buoy 50 may also be omitted, in which case the boom is inflated from on board the deploying craft.

If desired one or more intermediate buoys 50 may be provided along the length of the boom. The boom may be deployed directly by a large craft instead of from a smaller craft launched from the large craft. The boom may be deployed around an oil drilling rig from which oil is leaking.

Alternatively the boom may be deployed from the shore. The boom does not need to form an enclosed shape, especially when near the shore, and can have any desired shape in plan view, even a substantially straight line.

The membrane member 31 may be arranged to have an alternative configuration. It may slope at an angle to the horizontal of up to 45°, but preferably no more than 10° in order to provide some resistance to horizontal in addition to vertical forces. This reinforces its role as a sea anchor. The membrane may have an arcuate cross-section or a shallow V-shaped cross-section.

Other anchoring means may be used instead of or in addition to membrane member 31, provided they have sufficient surface area to control movement of the boom.

Instead of having separate boom chambers 12, the boom member 11 may be deployed in one continuous length.

Figure 6:
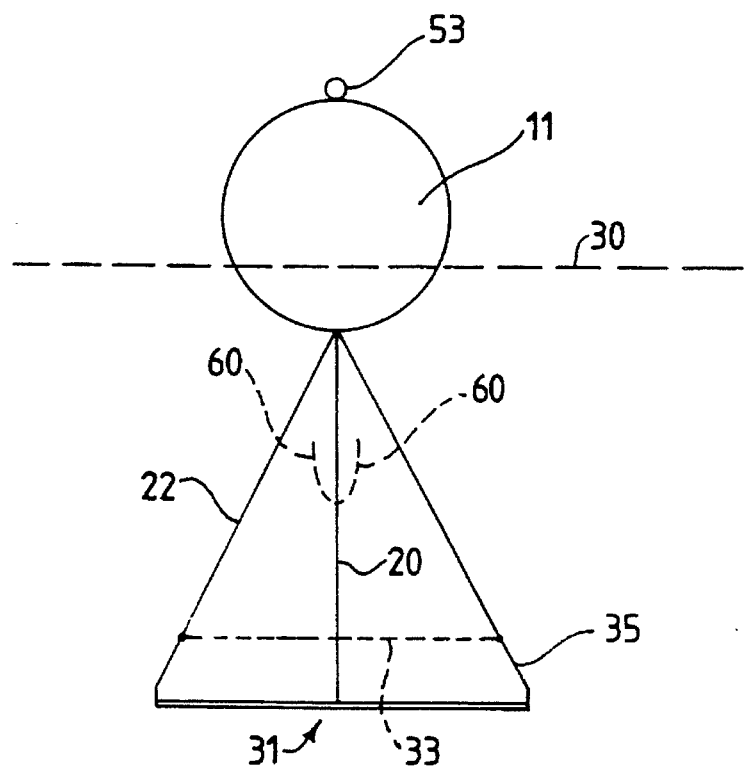
FIG 6 is a cross sectional view of another modification of the arrangement of FIG. 1.

As shown in the modification of FIG. 6, the edges of the membrane 32 may extend upwardly to form flaps 35. These edge flaps serve to resist sideways movement and enclose a body of water, which improves the ability of the membrane member to resist movement of the boom and to serve as a sea anchor.

Flap 20 may include one or more pockets 60 which open in an upwards direction. The pockets provide resistance to upwards movement of the containment arrangement, since they open and fill with water. Upon downwards movement, however, pockets 60 collapse and provide negligible resistance. Pockets 60 can be provided on any substantially vertically disposed surface of the containment arrangement such as flaps 25 or 35, or the flaps 20 of the previously-described arrangements. If it is required to provide resistance to downwards movement, one or more downwardly-facing pockets can be provided. FIG. 6 shows the membrane member located directly adjacent the bottom edge of the anti-pollution flap 20 and, since there are no intervening cable members, such a disposition is not embraced within the scope of the present invention.

Figure 7:
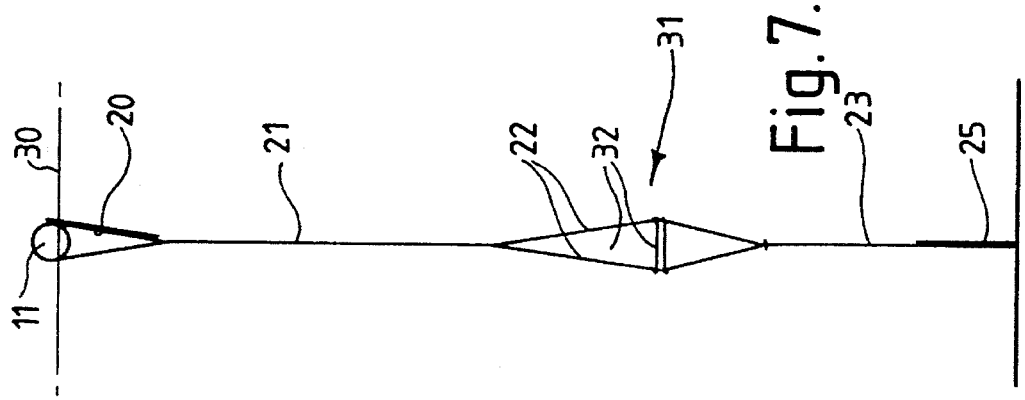
FIG. 7 is a cross sectional view of an arrangement in accordance with a second embodiment of the present invention.

As shown in the embodiment of FIG. 7 further cables 23 may be suspended below the membrane member 31. Attached to the bottom end of cables 23 is a flap 25 forming an anti-pollution barrier at the sea bed 60 or at any level between the sea bed and the boom member 11. Flap 25 is permeable and is arranged to retain heavy objects on the sea bed such as canisters.

Means may be provided for adjusting the effective length of the cable (i.e. the distance between the further member and the membrane member) in dependence upon prevailing sea-conditions. The adjustment may be effected manually when deploying the boom or after deployment. Alternatively the top of each cable member may be connected to the further member by means of an automatic length adjuster such as a pre-loaded spring system which, as the wave height changes and the force on the top of the cable member changes, automatically extends or retracts the cables.

As described so far the membrane member 31 acts as a stabiliser to prevent the boom member from being tossed around in moving seas, but does not actually harness the energy of the waves. To achieve this effect, FIGS. 8 to 10 show further containment arrangements in which a submerged or partly-submerged sprung tube 72 replaces or supplements the flap or skirt 20. In preferred arrangements, every significant wave deforms the tube 12 into an elongated ellipse which contains a lesser volume, and so exerts a potential pumping motion to the water or other fluid within it. The tube is fitted with suitable valves such that the waves induce a peristaltic pumping motion to the water along the length of the tube in a chosen direction dictated by a system of one-way valves along its length. Following this downward stroke, the sprung walls of the tube bring it back to its fuller circular volume, and as this occurs, water is drawn not only from the pressurised neighbouring part of the tube, but also from the surface of the sea, through a system of non-return valves. These are located for instance on the oil-polluted side, so that surface polluted water is drawn in to the tube, and from there pumped away into a container, or into an area where it can be treated. It thus serves the purpose of a skimmer.

In other applications of the same principle, the submerged pump can be used to create a current along one of its faces, such that surface water, flotsam and jetsam on one side of the boom are made to flow to one side, where they can be collected and disposed of.

The pumping device can also be used to deliver a fluid, for instance, a detergent, along the length of the boom from a central container.

In another application, an air chamber below the boom is, by the same motion of the waves, made to discharge air into the submerged pump cavity, from where it can be pumped as aerated water to significant depths below the surface, so as to improve the quality of the water.

Figure 8A:
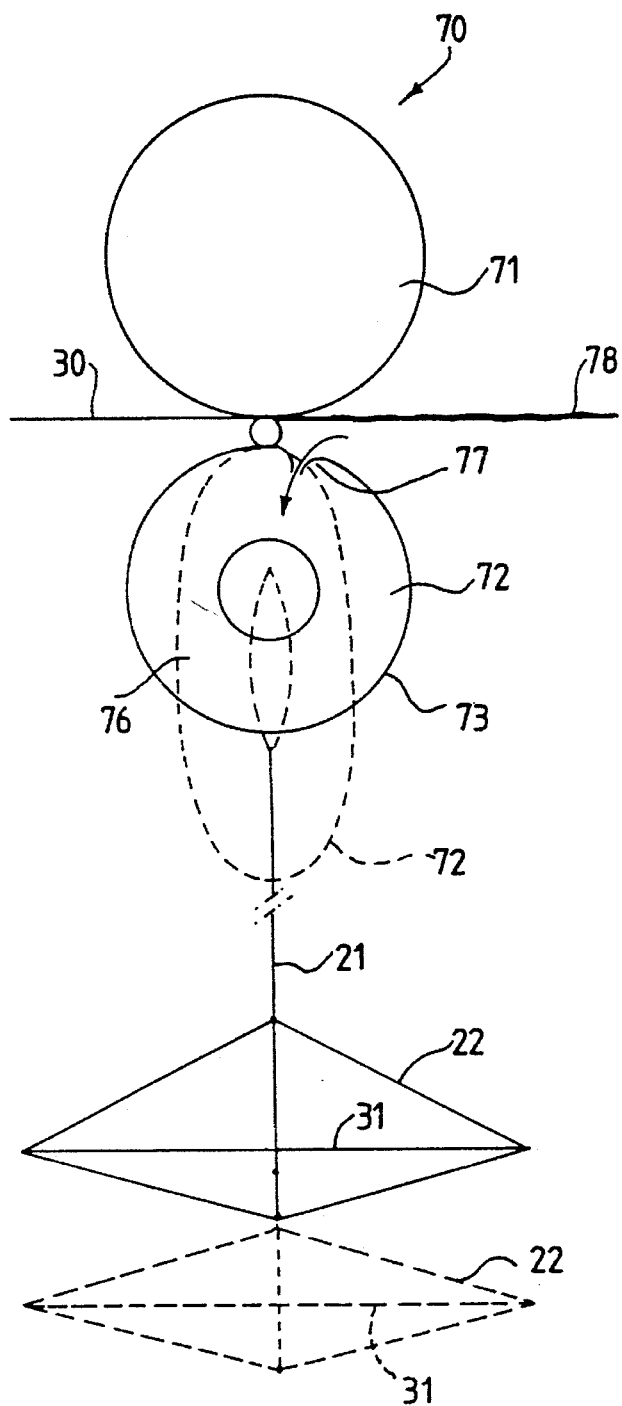
FIG. 8a is a cross-sectional view of an arrangement in accordance with a third embodiment of the present invention.

In FIG. 8a a containment arrangement 70 comprises a boom member 71 which is attached at its lower surface to a submerged tube 72 which is made of an elastic material such as polyurethane. The tube is stiffened by spring hoops 73 that can be deformed to take up an elongated oval shape shown in broken lines when tension is exerted on the tube 72 by the change in distance between the boom and the submerged reaction pad or membrane member 31. Instead of hoops 73 being provided the material of the tube itself may have the required deformation characteristics.

The oval shape defines a lesser volume than that initially defined by the circular shape of the tube 72. This causes the contents of one tube to be pressurised. The inside of the tube is fitted with a plurality of flaps 76 that allow a flow of liquid in one direction, but not in the other, so that the fluid is pumped axially along the centre of the tube 72.

Figure 8B:
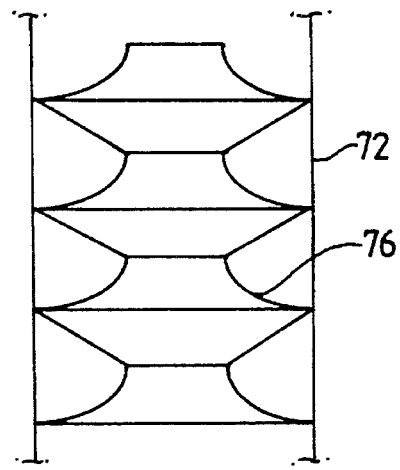
Figure 8C:
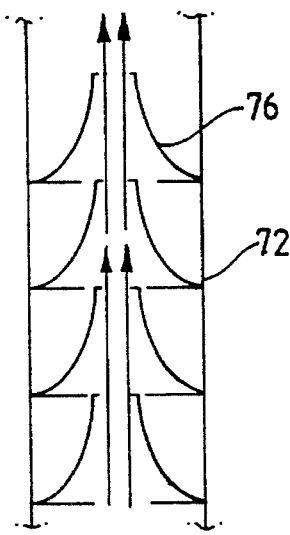

This pumping action can be used in a closed cycle to pump a fluid from one end of the tube 72 to the other, see FIGS. 8b and 8c. The FIG. 8c position is indicated in broken lines in FIG. 8a. It can also be used in an open cycle which will now be described.

A series of non-return or one way valves 77 can be incorporated into the tube 72, for example on the side of the boom member 71 where oil 78 might be spilt and need to be recovered or removed. As the pump tube 72 is deformed by the action between the boom member 11 and the membrane member 31, the increased pressure within the tube closes the one way valve 77 and pushes the fluid in the axial direction along the tube 72.

In the following wave cycle, the action between the boom member 71 and the membrane member 31 is relaxed, and the hoop springs 73, or the tube material itself, pull the tube back into its circular section, thereby inducing a negative pressure on the fluid, causing the one way valve 77 to open and suck in the surrounding fluid which contains the oil 78 to be removed or recovered.

The oil is thus both recovered and transported axially by the pump tube 72 to its destination, whether on shore or to a ship or dracoon. To effect this, it uses the energy of the waves. In flat calm conditions, other methods can more readily be used.

Figure 9A:
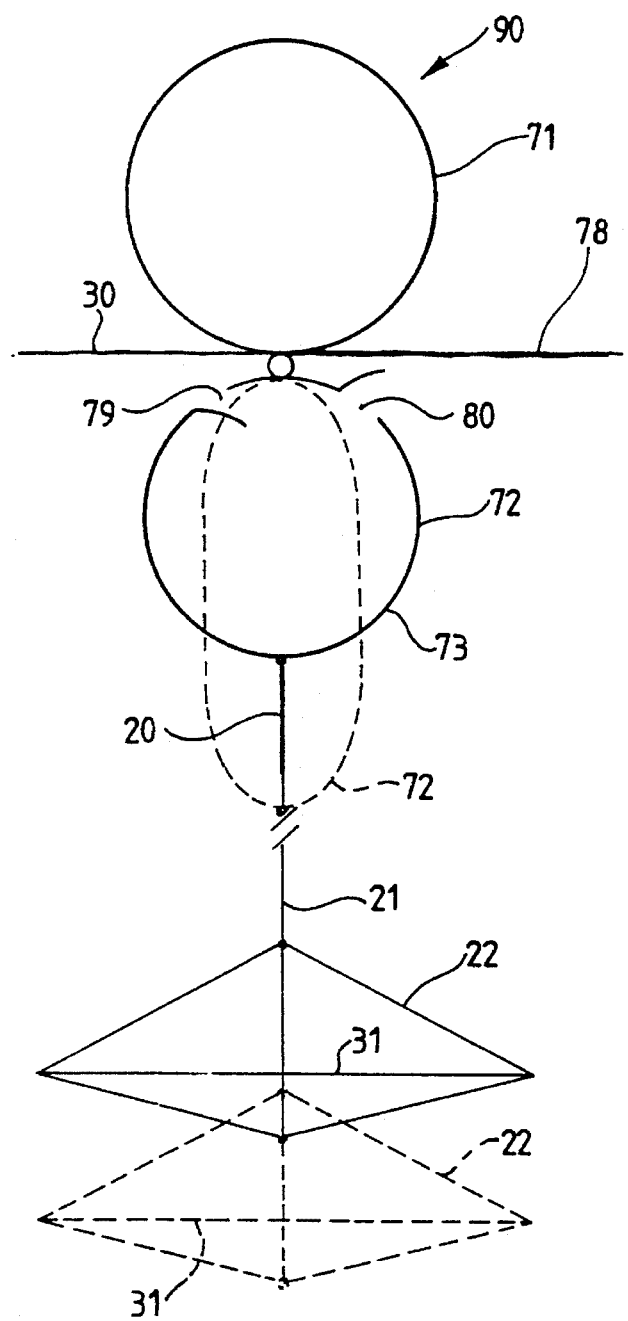
FIG. 9a is a cross-sectional view of an arrangement in accordance with a fourth embodiment of the present invention.
Figure 9B:
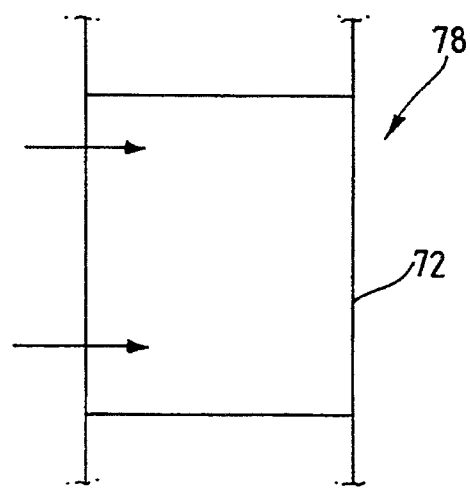
Figure 9C:
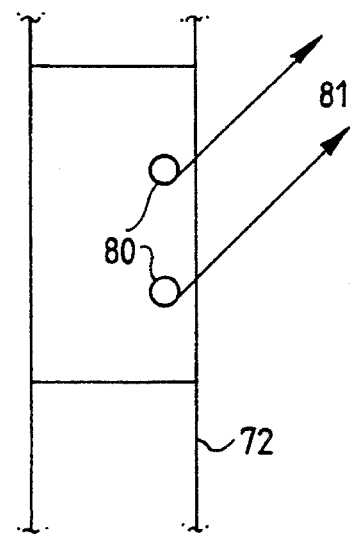

A simpler containment arrangement 90 is illustrated in FIG. 9a where the same general principles are used to induce a flow along the outside of the boom member 71 or to keep the oil of a slick 78 away from the boom member 71, and thus increase its effectiveness. In this embodiment, there is also provided a series of one way valves 79 on the "clean" side of the boom member such that, on the return cycle of the tube 72, clean water is sucked into the tube. On the extension cycle of the tube, clean water is expelled by one way valves 80 into the slick, this flow either being directed perpendicularly to the boom member, to keep the pollution 78 away from the boom member, or in a direction indicated by arrows 81 if it is required to shift the oil sideways.

The embodiment of FIG. 9a is especially preferred in that it comprises both a tube 72 and a flap 20 located between the tube and cable 21.

Figure 10A:
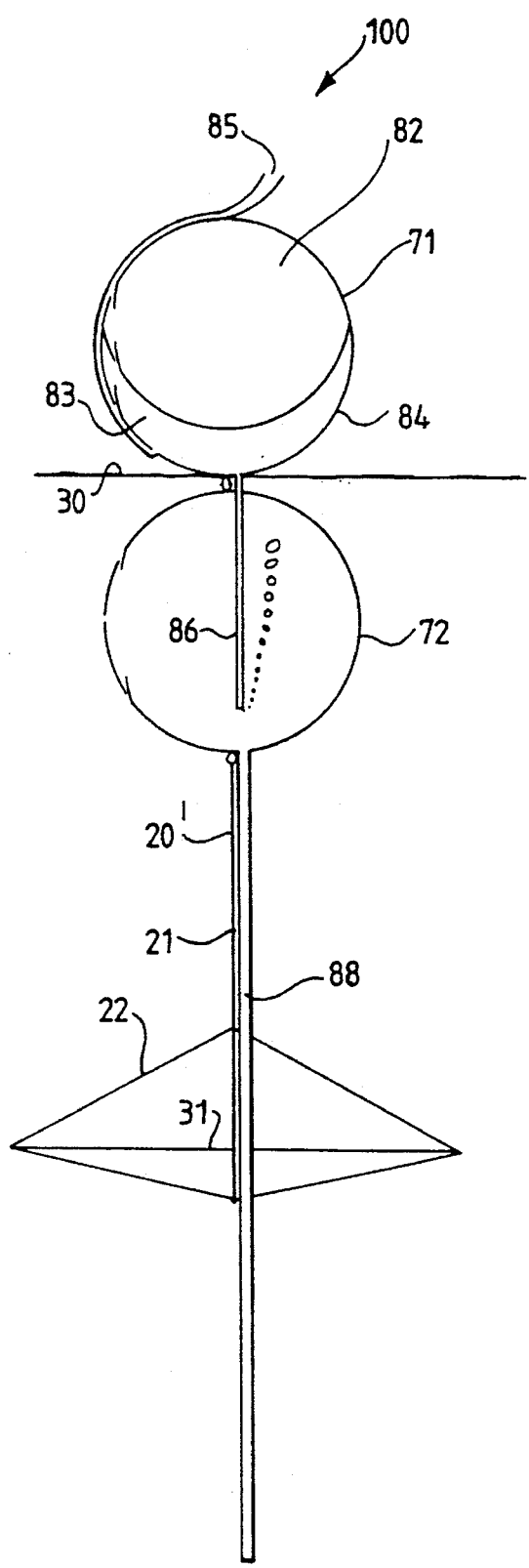
FIGS. 10a and 10b are cross-sectional views at different times of an arrangement in accordance with a fifth embodiment of the present invention.
Figure 10B:
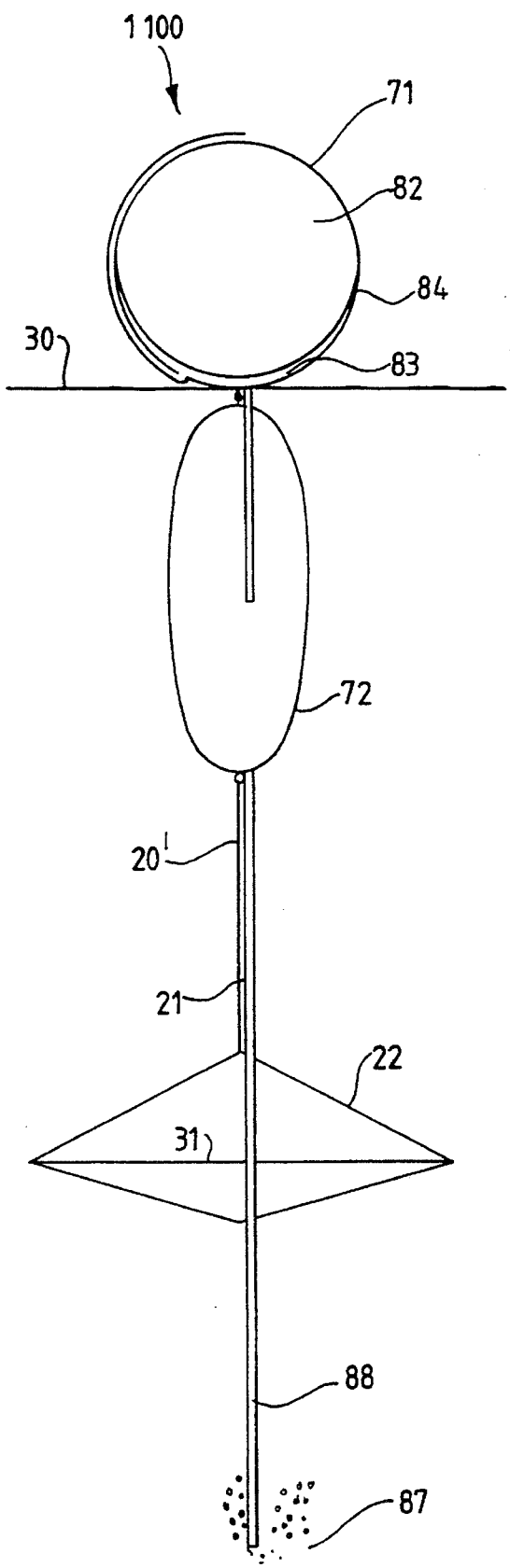

In the embodiment of FIGS. 10a and 10b the boom member 71 of a containment arrangement 100 comprises two elements, an inflated tube 82 and an air chamber 83 with elastic hoops 84. The arrangement is such that, when acted upon by the membrane member 31, air which had been drawn in on the recovery cycle through one way air valves 85 is now delivered under pressure to the submerged pump tube 72 by one way valves and tubes 86. At the same time as the pump tube 72 is deformed, air is supplied thereto so that the air can be pumped from the tube 72 as aerated water 87 by a hose 88 to a lower level. In this application, wave energy is used to deliver oxygen to a lower level where it may be needed to reduce pollution and encourage marine life.

In the embodiments described in connection with FIGS. 8, 9 and 10 the pumping action may be used to power a dynamo or other device for operating, or charging batteries for, monitoring equipment, pollution removal equipment, navigational lighting or other electrical equipment. In preferred modifications, the embodiments of FIGS. 8 and 10 are also provided with a flap 20; in these cases; the top portion of cable 21 (indicated by 20') is simply replaced by a flap. In other modifications the flap 20 may be provided between the boom member 71 and the tube 72.

We claim:

1. A containment arrangement comprising an inflatable boom member arranged to float on the water, at least one further member depending from the boom member, a plurality of cable members depending from the further member, and depending from the cable members, a membrane member which, in use, is arranged to be below and spaced from said further member; and which produces substantial water resistance to movement of the boom member, the surface of the membrane member being arranged to be horizontal or at an angle to the horizontal of up to 45°.

2. An arrangement according to claim 1 wherein the membrane member is disposed within 10° of the horizontal.

3. An arrangement according to claim 1 or 2, wherein the membrane member comprises a membrane held between two generally parallel edge support members in the form of pressurised tubes maintained at a desired spacing by cross battens.

4. An arrangement according to claim 1 comprising, at or adjacent to a part of the boom member, a buoy incorporating means for inflating the boom member.

5. An arrangement according to claim 1 wherein said further member comprises an anti-pollution flap or skirt.

6. An arrangement according to claim 1 wherein said further member comprises a submerged deformable tube which pumps fluid in response to forces on said membrane member and transmitted by said cable members caused by motion of the water.

7. An arrangement according to claim 6 wherein said tube extends generally horizontally parallel to the boom member and either between the boom member and the further member or between the further member and the cable member.

8. An arrangement according to claim 6 or 7 wherein the tube pumps fluid internally along its length, and/or into and/or out of the surrounding water, or via a pipe member to a deeper region of the water.

* * * * *